United States Patent
Sato

[19]

[11] Patent Number: 6,034,009
[45] Date of Patent: Mar. 7, 2000

[54] LINING FOR INTERIOR AND METHOD OF PRODUCING SAME

[75] Inventor: Yoshimi Sato, Yokohama, Japan

[73] Assignee: Ikeda Bussan Co., Ltd., Ayase, Japan

[21] Appl. No.: 08/947,874

[22] Filed: Oct. 9, 1997

[30] Foreign Application Priority Data

Oct. 9, 1996 [JP] Japan ................................. 8-268735

[51] Int. Cl.$^7$ ......................................... B32B 5/06
[52] U.S. Cl. .................... 442/388; 442/389; 442/341; 442/344; 442/350; 442/394
[58] Field of Search ........................ 442/341, 350, 442/388, 389, 394

[56] References Cited

U.S. PATENT DOCUMENTS

| | | | |
|---|---|---|---|
| 4,229,397 | 10/1980 | Fukuta et al. | 264/113 |
| 4,277,531 | 7/1981 | Picone | 428/228 |
| 4,407,885 | 10/1983 | Murphy et al. | 428/246 |
| 4,410,385 | 10/1983 | Murphy et al. | 156/181 |
| 4,568,581 | 2/1986 | Peoples, Jr. | 428/35 |

FOREIGN PATENT DOCUMENTS

| | | |
|---|---|---|
| 27 54 929 | 6/1978 | Germany . |
| 30 50 887 | 2/1982 | Germany . |
| 31 42 226 | 8/1982 | Germany . |
| 39 35 689 | 5/1991 | Germany . |
| 40 02 062 | 7/1991 | Germany . |
| 44 23 739 | 1/1996 | Germany . |
| 3-21443 | 1/1991 | Japan . |
| 3-130450 | 6/1991 | Japan . |
| 4-126860 | 4/1992 | Japan . |
| 6-257053 | 9/1994 | Japan . |
| 92-05949 | 4/1992 | WIPO . |

*Primary Examiner*—Christopher Raimund
*Attorney, Agent, or Firm*—Foley & Lardner

[57] ABSTRACT

A lining for interior comprises a first layer composed of fibers of higher melting point, which are bound by a thermoplastic resin of lower melting point. A second layer is placed on the first layer, which is constructed of a thermoplastic resin of lower melting point. A third layer is placed on the second layer. The third layer is composed of fibers of higher melting point which are bound by a thermoplastic resin of lower melting point. A fourth layer is placed on the third layer, which is constructed of a thermoplastic resin of lower melting point. A fifth layer is placed on the fourth layer, which is constructed of an skin member having higher melting point. The first and third layers are bonded to each other through the second layer and the third and fifth layers are bonded to each other through the fourth layer.

11 Claims, 2 Drawing Sheets

LINING FOR INTERIOR AND METHOD OF PRODUCING SAME

BACKGROUND OF THE INVENTION

1. Field of the Invention

The present invention relates to a lining or decorative board applied to an interior portion of an automotive vehicle, such as, a ceiling panel, body panel, door panel, trunk wall or the like, and to a method of producing such lining.

2. Description of the Prior Art

Hitherto, various types of linings or decorative board for automotive interiors have been proposed and put into practical use. Some of them are disclosed in Japanese Patent First Provisional Publications 3-21443, 3-130450, 4-126860 and 6-257053. The lining of these publications comprises mixed fibers of higher and lower melting points which art shaped or pressed into a board by melting the lower melting point fibers. That is, for producing the lining of 3-21443 publication, an upper web layer including mixed fibers of higher and lower melting points is put on a somewhat higher density lower web layer including mixed fibers of higher and lower melting points. Needle punching is applied to the entire of the upper and lower web layers to interwind or entangle the fibers of the layers and then the entire of the two layers is pressed while being heated at a temperature sufficient to melt only the lower melting point fibers. In case of the lining of 3-130450 publication, an upper web including mixed fibers of higher and lower melting points is subjected to a needle punching to provide a napped lower surface. A lower web including mixed fibers of higher and lower melting points is fitted to the napped lower surface of the upper web and the whole of the upper and lower webs is heated to melt the lower melting point fibers. In case of the lining of 4-126860 publication, a web including mixed fibers of higher and lower melting points is heated and subjected to a combing process to be shaped. In case of the lining of 6-257053, a mat including mixed fibers of higher and lower melting points is needled and applied on each surface thereof with an aqueous emulsion of plastic. The mat is then heated and pressed with a temperature sufficient to melt the lower melting point fibers and cure the emulsion.

However, the linings produced in the above-mentioned conventional methods have failed to give users satisfaction due to their poor quality. In fact, some of them are easily soiled due to static electricity inevitably generated thereon and some of them tend to produce noise when used on the interior portion of a motor vehicle.

SUMMARY OF THE INVENTION

It is therefore an object of the present invention to provide a lining for interior, which can give users satisfaction due to its excellent quality. That is, the lining of the invention is free of the above-mentioned drawbacks.

According to a first aspect of the present invention, there is provided a lining for interior, which comprises a first layer composed of fibers of higher melting point, the fibers being bound by a thermoplastic resin of lower melting point; a second layer placed on the first layer, the second layer being constructed of a thermoplastic resin of lower melting point; a third layer placed on the second layer, the third layer being composed of fibers of higher melting point, the fibers being bound by a thermoplastic resin of lower melting point; a fourth layer placed on the third layer, the fourth layer being constructed of a thermoplastic resin of lower melting point; an entangled formation provided in each of the first and third layers; and a fifth layer placed on the fourth layer, the fifth layer being constructed of an skin member having higher melting point, wherein the first and third layers are bonded to each other through the second layer and said third and fifth layers are bonded to each other through the fourth layer.

According to a second aspect of the present invention, there is provided a method of producing a lining for interior, which comprises the steps of (a) preparing a layered structure which includes a first layer composed of mixed fibers of higher and lower melting points, a second layer put on the first layer and composed of fibers of lower melting point, a third layer put on the second layer and composed of mixed fibers of higher and lower melting points and a fourth layer put on the third layer and composed of fibers of lower melting point; (b) applying a needling to the layered structure to form an entangled formation in the layered structure; (c) putting a fifth layer on the fourth layer of the layered structure to provide an unfinished lining, the fifth layer being constructed of a material of higher melting point; and (d) pressing the unfinished lining while heating the same at a temperature sufficient to melt only the fibers of lower melting point.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
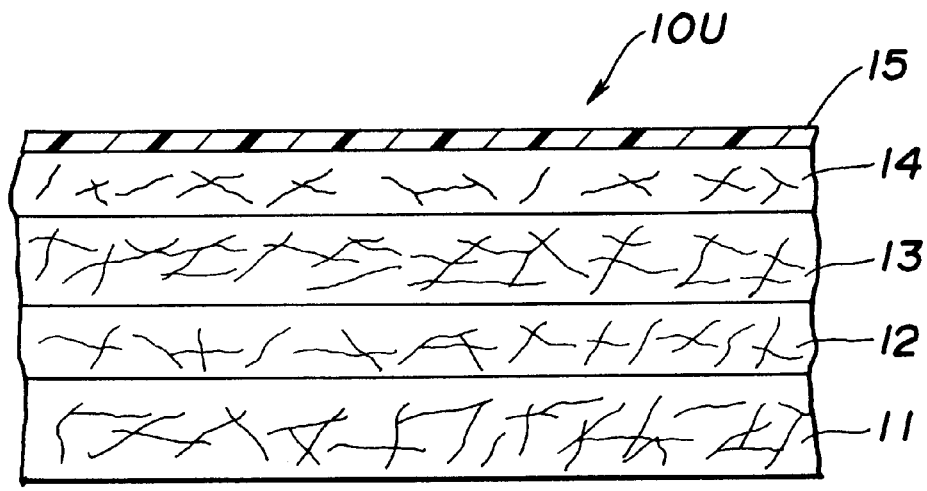
FIG. 1 is a sectional view of an unfinished lining of the present invention.

Referring to FIG. 1, there is shown an unfinished lining 10U of the present invention. As shown, the unfinished lining 10U comprises first, second, third, fourth and fifth layers 11, 12, 13, 14 and 15 which are put on one another in the illustrated manner.

The first and third layers 11 and 13 are each composed of mixed fibers of higher and lower melting points.

The second and fourth layers 12 and 14 are each composed of thermoplastic fibers of lower melting point.

The fibers of higher melting point are plastic fibers and/or natural fibers. That is, the plastic fibers are those having a melting point higher than 200° C., such as polyester fibers (polyethyleneterephthalate (PET) fibers and the like), polyamide fibers (NYLON (trade name) fibers and the like) and polyacrylonitrile fibers. While, the natural fibers are cotton fibers, bast (or hemp) fibers, reused wool fibers and the like.

The thermoplastic fibers of lower melting point are those having a melting point lower than 160° C., such as polyethylene (PE) fibers, polypropylene (PP) fibers, polyolefinic fibers (viz., copolymer of PE and PP) and the like.

The higher and lower melting point fibers each have a thickness ranging from 1 to 400 deniers and each have a length ranging from 5 to 200 mm.

The mixing ratio of the higher and lower melting point fibers in each of the first and third layers 11 and 13 can be varied at will depending on the shape and place to which the lining is applied.

For example, when polyethyleneterephthalate (PET) fibers and reused wool fibers are selected as the higher melting point fibers and polypropylene (PP) fibers are selected as the lower melting point fibers, the first or third layer 11 or 13 may contain 70% by weight of polyethyleneterephthalate (PET) fibers, 10% by weight of reused wool fibers and 20% by weight of polypropylene (PP) fibers. Of course, the first and third layers 11 and 13 may have a different mixing ratio.

When polypropylene (PP) fibers are selected as the lower melting point fibers, the second or fourth layer 12 or 14 may contain 100% by weight of polypropylene (PP) fibers. However, if desired, a certain amount of polyethylene (PE) fibers may be added to the PP fibers.

The fifth layer 15 is an outer skin member, such as a higher melting point plastic sheet, non-woven fabric or the like. The higher melting point plastic sheet is made of polyester (polyethyleneterephthalate (PET)), polyamide (NYLON (trade name)) or polyacrylonitrile.

It is to be noted that the thickness of the first, second, third, fourth or fifth layer 11, 12, 13, 14 or 15 can be varied in accordance with user's need.

The unfinished lining 10U having the above-mentioned structure is then subjected to a needling. Before this needling, the fifth layer 15 is removed from the fourth layer 14. That is, the stacked first, second, third and fourth layers 11, 12, 13 and 14 are needled to form an entangled formation therein. Then, the fifth layer 15 is put on the fourth layer 14 of the needled and layered structure and the entire of these layers is put into a press machine (not shown) to be pressed while being heated. The heating is so controlled as to melt only the lower melting point fibers. In other words, the heating is carried out with a temperature of about 160° C.

Figure 2:
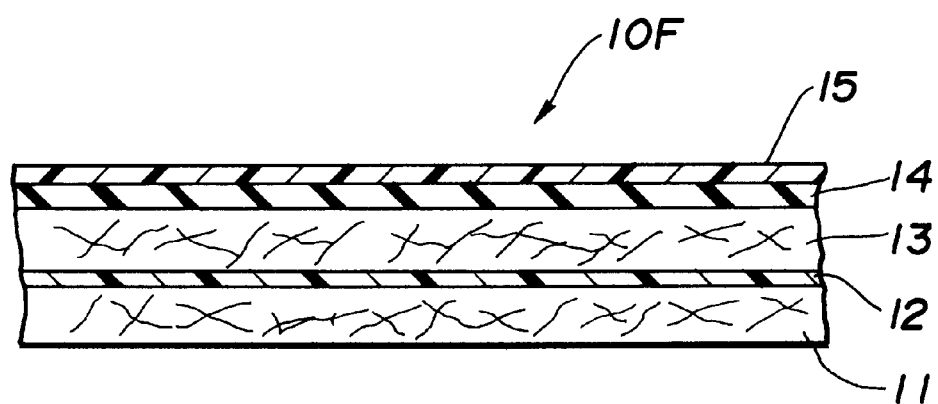
FIG. 2 is a sectional view of a lining of the present invention which is finished.

With these steps, a finished lining 10F as shown in FIG. 2 is produced.

As is seen from this drawing, due to melting, the second and fourth layers 12 and 14 are shaped like a film. Due to presence of the melted second layer 12, the first and third layers 11 and 13 are tightly bonded to each other. Due to presence of the melted fourth layer 14, the fifth layer 15 is tightly bonded to the third layer 13 without producing unsightly creases thereon.

In the first and third layers 11 and 13, the lower melting point fibers are melted and thus the higher melting point fibers in each layer 11 or 13 are bonded or bound to one another.

The bonding or binding appearing in the finished lining 10F brings about increase in mechanical strength and durability of the finished lining 10F.

Figure 3:
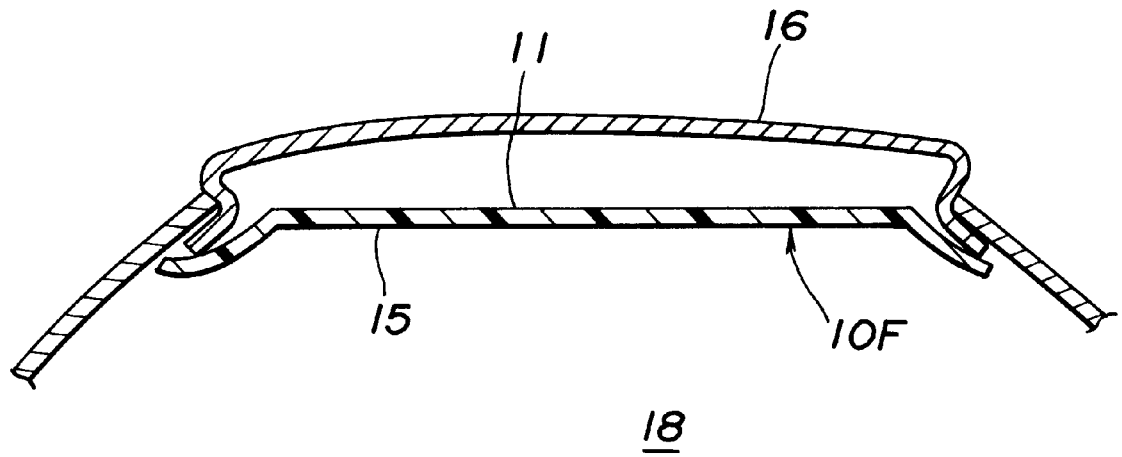
FIG. 3 is a sectional view showing the finished lining of the present invention practically applied to an automotive ceiling panel.

FIG. 3 shows an example in which the finished lining 10F is practically applied to a ceiling panel 16 of a motor vehicle with the fifth layer 15 (viz., outer skin member) exposed to a vehicle cabin 18. Before the application, the finished lining 10F is pressed under heating to provide a trimmed board for the ceiling 16. Due to usage of the thermoplastic resin as the material for the second and fourth layers 12 and 14, shaping or thermoforming of the lining 10F is easily carried out. Although not shown in the drawing, known connecting members are used for connecting a peripheral portion of the trimmed board to the ceiling panel 16.

Due to presence of the melted film-like second and fourth layers 12 and 14 (see FIG. 2), the trimmed board (viz., finished lining 10F) does not have air permeability. Thus, the trimmed board in the vehicle cabin 18 is suppressed from generating static electricity caused by air passing therethrough. Thus, soiling of the outer skin member 15 is suppressed or at least minimized.

Figure 4:
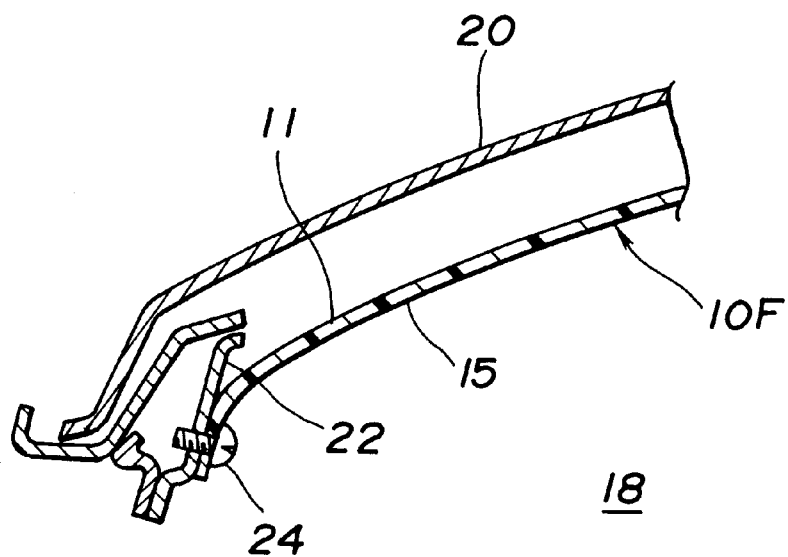
FIG. 4 is a sectional view of the finished lining of the present invention practically applied to an automotive body panel.

FIG. 4 shows an example in which a trimmed board of the finished lining 10F is practically applied to an automotive body panel 20 with the fifth layer 15 (viz., outer skin member) exposed to the vehicle cabin 18. Denoted by numeral 22 is a mounting bracket possessed by the body panel 20. A peripheral portion of the trimmed board is connected to the mounting bracket 22 through a bolt 24, as shown. Under this condition, the first layer 11 (see FIG. 2) of the trimmed board, which is flexible, is pressed against the mounting bracket 22. Thus, even when the peripheral portion of the trimmed board is slid relative to the mounting bracket 22, there is produced no noise.

It is to be understood that, although the invention has been described with specific reference to particular embodiments thereof, it is not to be so limited since changes and alternations therein may be made which are within the full intended scope of this invention as defined by the appended claims.

What is claimed is:

1. A lining for interior, comprising:

a first layer comprised of fibers having a relatively high melting point, said fibers being bound by a thermoplastic resin having a relatively low melting point;

a second layer placed on said first layer, wherein said second layer is of a different composition than said first layer, said second layer being constructed of a thermoplastic resin having a relatively low melting point;

a third layer placed on said second layer, said third layer being comprised of fibers having a relatively high melting point, said fibers being bound by a thermoplastic resin having a relatively low melting point;

a fourth layer placed on said third layer, wherein said fourth layer is of a different composition than said third layer, said fourth layer being constructed of a thermoplastic resin having a relatively low melting point;

a layered structure including said first, second, third and fourth layers;

an entangled formation provided by applying a needling to said layered structure; and a fifth layer placed on said fourth layer, said fifth layer being constructed of a skin member having a relatively high melting point, wherein said first and third layers are bonded to each other through said second layer and said third and fifth layers are bonded to each other through said fourth layer, and wherein said fifth layer is bonded to said fourth layer.

2. A lining as claimed in claim 1, in which the bonding between said first and third layers is achieved by melting said second layer, and in which the bonding between said third and fifth layers is achieved by melting said fourth layer.

3. A lining as claimed in claim 2, in which said second and fourth layers are provided by melting thermoplastic fibers which have been placed in corresponding positions.

4. A lining as claimed in claim 2, in which the thermoplastic resin having a relatively low melting point is of a material selected from the group consisting of polyethylene and polypropylene.

5. A lining as claimed in claim 4, in which the fibers having a relatively high melting point are of a material selected from the group consisting of polyester, polyamide and polyacrylonitrile.

6. A lining as claimed in claim 4, in which the fibers having a relatively high melting point are of a material selected from the group consisting of cotton, hemp and reused wool fibers.

7. A lining as claimed in claim 2, in which the fibers having a relatively high melting point each have a thickness ranging from 1 to 400 deniers and a length ranging from 5 to 200 mm.

8. A lining as claimed in claim 2, comprising a layered structure which includes said first layer comprised of mixed fibers of relatively high and relatively low melting points, said second layer consisting essentially of fibers having a relatively low melting point, wherein said relatively low melting point fibers have been melted and fused with the relatively low melting point fibers of said first layer and said third layer; a third layer comprised of mixed fibers of relatively high and relatively low melting points, a fourth layer consisting essentially of fibers having a relatively low melting point, wherein said relatively low melting point fibers have been melted and fused with the relatively low melting point fibers of said third layer, said fifth layer comprised of a skin member having a relatively high melting point, said fifth layer bonded to said fourth layer.

9. A lining as claimed in claim 2, comprising melted film-like second and fourth layers.

10. A lining as claimed in claim 2, wherein said fifth layer comprises a plastic film.

11. A lining for interior, comprising:

a first layer comprised of fibers having a relatively high melting point, said fibers being bound by a thermoplastic resin having a relatively low melting point;

a second layer placed on said first layer, said second layer consisting essentially of a thermoplastic resin having a relatively low melting point;

a third layer placed on said second layer, said third layer being comprised of fibers having a relatively high melting point, said fibers being bound by a thermoplastic resin having a relatively low melting point;

a fourth layer placed on said third layer, said fourth layer consisting essentially of a thermoplastic resin having a relatively low melting point;

a layered structure including said first, second, third and fourth layers;

an entangled formation provided by applying a needling to said layered structure; and a fifth layer placed on said fourth layer, said fifth layer comprising a skin member having a relatively high melting point, wherein said first and third layers are bonded to each other through said second layer and said third and fifth layers are bonded to each other through said fourth layer, and wherein said fifth layer is bonded to said fourth layer.

* * * * *